United States Patent Office 3,290,217
Patented Dec. 6, 1966

3,290,217
METHOD OF TREATING PROTEIC ANABOLISM
Genevieve Azadian, Paris, France, assignor to Roussel-UCLAF, Paris, France, a corporation of France
No Drawing. Filed Mar. 2, 1964, Ser. No. 348,755
Claims priority, application France, Mar. 5, 1963, 926,872
2 Claims. (Cl. 167—74)

The invention relates to novel compositions for the treatment of proteic anabolism which contain 17α-methyl-$\Delta^{3,5}$-androstadiene-17β-ol as the active principle. The invention also relates to a novel method of treating proteic anabolism.

Numerous anabolic agents are known such as 17α-methyl-testosterone and 17α-methyl-19-nor-testosterone which are active orally but they also possess a pronounced androgenic activity.

It is an object of the invention to provide compositions for the treatment of proteic anabolism with little androgenic activity.

It is another object of the invention to provide a novel method of treating proteic anabolism.

These and other objects and advantages of the invention will become obvious from the following detailed description.

The novel compositions of the invention for the treatment of proteic anabolism are comprised of 17α-methyl-$\Delta^{3,5}$-androstadiene-17β-ol of the formula

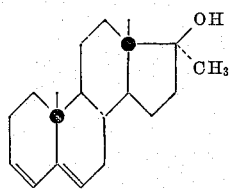

and a major amount of a pharmaceutical carrier. The said compositions may be in the form of injectable solutions or suspensions in ampules and multiple dose treatment of astheni, thinness, disturbances of growth and syrups and capsules prepared in the usual manner.

The compositions of the invention are useful for the treatment of asthenia, thinness, disturbances of growth and metabolic disturbances due to prolonged corticotherapy.

The method of the invention of treating proteic anabolism comprises administering to warm blooded animals an effective amount of 17α-methyl-$\Delta^{3,5}$-androstadiene-17β-ol. The said product can be administered orally, perlingually, transcutaneously and rectally. The usual useful dosology is between 5 and 10 mg. per dose and 10 and 40 mg. per day in the adult depending upon the method of administration.

17α-methyl-$\Delta^{3,5}$-androstadiene-17β-ol may be prepared by reacting 17α-methyl-$\Delta^{4}$-androstene-3β,17β-diol with a dehydrating agent such as sulfuric acid according to the following reaction scheme.

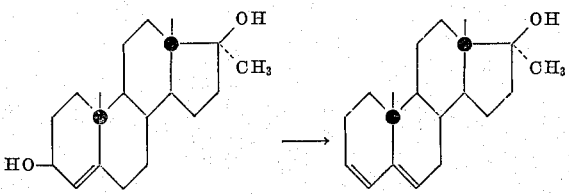

In the following examples there are described several preferred embodiments to illustrate the invention. However, it should be understood that the invention is not intended to be limited to the specific embodiments.

*Example I.—Preparation of 17α-methyl-$\Delta^{3,5}$-androstadiene-17β-ol*

1.203 gm. of 17α-methyl-$\Delta^{4}$-androstene-3β,17β-diol were admixed with a solution of 60 cc. of ethyl alcohol, 30 cc. of water and 15 cc. of N sulfuric acid and the mixture was heated to reflux for one hour with agitation to effect rapid dissolution. Then, the reaction mixture was iced and the precipitate formed was separated by vacuum filtration, washed with water and dried to obtain 0.90 gm. of a product melting at 144–145° C. The said product was dissolved in 13.5 cc. of hot ethyl alcohol and the resulting solution was filtered. 4 cc. of hot water were added thereto and the solution was slowly cooled. The crystals formed were separated, vacuum filtered, washed and dried to obtain 0.69 gm. of 17α-methyl-$\Delta^{3,5}$-androstadiene-17β-ol having a melting point of 147–148° C.

The product occurred in the form of a colorless solid soluble in benzene, chloroform and alcohol, slightly soluble in aqueous alcohol and insoluble in water.

Analysis.—$C_{20}H_{30}O$; molecular weight=286.44. Calculated: C, 83.85%; H, 10.56%. Found: C, 83.40%; H, 10.50%.

U. V. Spectra (ethanol): λ 228 mμ, ε=18,900; λ 235 mμ, ε=20,500; λ 244 mμ, ε=13,100.

Pelc (Coll. Czech. Chem. Comm., vol. 25, 1960, p. 309) has described a product allegedly having the formula of 17α-methyl-$\Delta^{3,5}$-androstadiene-17β-ol but the product shows different physical characteristics. Moreover, no medical study of the said product has been made.

*Example II.—Preparation of injectable suspension of 17α-methyl-$\Delta^{3,5}$-androstadiene-17β-ol*

17α-methyl-$\Delta^{3,5}$-androstadiene-17β-ol was sterilized by heating it in suspension in an aqueous solution of benzyl alcohol and was then aseptically micropulverized in its liquid phase. To the resulting suspension, there were aseptically added an aqueous solution of sodium chloride whose concentration was 9 to 50 parts per thousand (to make the solution isotonic), polysorbate 80 (a nonionic surface active agent) and an aqueous solution of sodium carboxymethyl cellulose whose concentration was 0.5 to 2.0 parts per hundred (viscosity agent) which substances had been previously sterilized by heat. The said suspension was adjusted to a concentration of 1 gm. of product per 100 cc. The suspension, maintained homogeneous by agitation, was aseptically divided and placed in ampules or flacons having a volume of 1 to 20 cc. Other injectable suspensions having concentration between 0.5 and 20 parts per hundred could be prepared by a similar procedure.

*Example III.—Preparation of tablets containing 5 mg. of 17α-methyl-$\Delta^{3,5}$-androstadiene-17β-ol*

17α-methyl-$\Delta^{3,5}$-androstadiene-17β-ol, white sugar, potato starch and lactose were successively introduced into an appropriate mixer and after the mixture was homogenized, an aqueous solution of gelatine was added in sufficient quantity to obtain a pretableting mass suitable for granulation on a perforated metallic plate. After granulation, the granules were spread as a thin layer on a platform and dried in an oven at 50° C. The dry granules were then ground through a metallic cloth of appropriate size and admixed with talc and magnesium stearate for lubrication. The granular powder was pressed into tablets of the desired weight and the average weight tolerance of a lot of 10 tablets was ±5% of the theoretical weight. The weight of the tablets should be between 80 and 750 mg. for oral administration and should contain 0.6 to 6% of 17α-methyl-$\Delta^{3,5}$-androstadiene-17β-ol.

*Example IV.—Preparation of suppositories containing 10 mg. of 17α-methyl-Δ$^{3,5}$-androstadiene-17β-ol*

0.100 kg. of 17α-methyl-Δ$^{3,5}$-androstadiene-17β-ol and 0.800 kg. of lactose codex were successively introduced into a small mixer and the resulting mixture was sieved through a No. 60 stainless steel sieve.

19.230 kg. of cocoa butter melted at 50° C. were introduced into a cell having a double jacket and a mechanical stirrer and the cocoa butter was allowed to cool to 35–40° C. while stirring. Then, 0.020 kg. of α-tocophenol was rinsed with a small amount of the cocoa butter which was added to the double jacketed cell. The first mixture containing the active product was then added thereto in small fractions and the mixture was then placed in a cell having as tight a lid as possible. A slight current of nitrogen was passed into the cell and a current of cold water was passed through the double jacket until the reaction mass had a pasty consistency or a temperature of about 25° C.

The said material was then reheated slightly by passing steam through the double jacket to bring the mass to a sufficiently fluid consistency for casting (30–32° C.). This temperature and mechanical stirring were maintained during casting. The reaction mass was poured through a lateral orifice heated to 35° into a series of small cells held by metallic bands. After several minutes, the reaction mass solidified and the cells were levelled with a wiper. The assembly of cells was placed in a refrigerated chest maintained at −10° C. to effect solidification of the suppositories. The metal bands were removed from the cells in the refrigerated chest and the cells were opened to obtain 10 suppositories having a final weight of 2 gm. and containing 10 mg. of 17α-methyl-Δ$^{3,5}$-androstadiene-17β-ol.

*Pharmacological data.—Androgenic and anabolic activity determination*

The test was effected according to the method of Hershberger (Proc. Soc. Exp. Biol. Med., vol. 83, 1953, p. 175) slightly modified.

The test consisted of administering daily oral doses of the products being tested in aqueous suspension to lots of male rats which had been castrated at the age of 3½ weeks. The rats were treated starting the day after castration for a period of 10 days with 1 to 5 mg. of product per rat and per day and were then sacrificed on the eleventh day, 22 to 26 hours after the last administration. The sacrificed animals were autopsied and the necessary organs were separated and weighed. The lifter muscle of the anus (levator ani) was studied for the anabolic activity and the ventral prostate and the seminal vesicules were studied for the simultaneous androgenic effect. The results of the tests with 17α-methyl-Δ$^{3,5}$-androstadiene-17β-ol and 17α-methyl-testosterone (for comparison) are summarized in the following table.

TABLE

| Treatment | Daily Dose | Duration of treatment (days) | Body Weight in gm. Initial | Body Weight in gm. Final | Seminal vesicules (mg.) | Ventral prostate (mg.) | Fresh Levator ani (mg.) | Lf (1) | Dried Levator ani (mg.) | Ls (2) |
|---|---|---|---|---|---|---|---|---|---|---|
| Control | 0 | 10 | 48 | 92 | 6.6 | 16.6 | 16.94 | 0.184 | 4.1 | 0.045 |
| 17α-methyl testosterone | 1 | 10 | 49 | 97 | 15.2 | 61.8 | 38.4 | 0.395 | 12.3 | 0.124 |
|  | 5 | 10 | 46 | 83 | 61.0 | 99.0 | 31.6 | 0.377 | 7.2 | 0.085 |
| 17α-methyl-Δ$^{3,5}$-androstadiene-17β-ol | 1 | 10 | 49 | 99 | 9.8 | 35.1 | 25.9 | 0.258 | 6.4 | 0.064 |
|  | 5 | 10 | 49 | 87 | 18.6 | 52.9 | 39.3 | 0.450 | 9 | 0.103 |

Lf=ratio of the weight of the fresh levator ani×10$^3$ to the body weight.
Ls=ratio of the weight of the dried levator ani×10$^3$ to the body weight.

The above table shows that 17α-methyl-Δ$^{3,5}$-androstadiene-17β-ol possess an anabolic activity comparable to 17α-methyl-testosterone but has a weaker androgenic activity.

Various modifications of the compositions of the invention may be made without departing from the spirit or scope thereof and it is to be understood that the invention is to be limited only as defined in the appended claims.

I claim:

1. A method of treating proteic anabolism in warm blooded animals which comprises administering daily an effective amount of 17α-methyl-Δ$^{3,5}$-androstadiene-17β-ol.

2. The method of claim 1 wherein the effective amount is 10 to 40 mg.

References Cited by the Examiner

Pelc: Collection Czechoslovak Chemical Communications, vol. 25, pp. 309–312.

JULIAN S. LEVITT, *Primary Examiner.*

L. B. RANDALL, *Assistant Examiner.*